US010254736B2

United States Patent
(12) United States Patent
Wiley et al.
(10) Patent No.: US 10,254,736 B2
(45) Date of Patent: Apr. 9, 2019

(54) GENERATING AND TRACKING UNIQUE IDENTIFIERS FOR PROGRAMMABLE MOBILE MACHINES

(71) Applicant: Facebook, Inc., Menlo Park, CA (US)

(72) Inventors: Scott C. Wiley, Los Altos, CA (US); Michael Epstein, Danville, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/700,110

(22) Filed: Sep. 9, 2017

(65) Prior Publication Data

US 2019/0079484 A1 Mar. 14, 2019

(51) Int. Cl.
*G06K 19/00* (2006.01)
*G05B 19/05* (2006.01)
*G06K 9/00* (2006.01)
*G05B 19/048* (2006.01)

(52) U.S. Cl.
CPC ......... *G05B 19/05* (2013.01); *G06K 9/00496* (2013.01); *G05B 19/048* (2013.01)

(58) Field of Classification Search
USPC ................ 235/435, 439, 454, 462, 487, 492
See application file for complete search history.

(56) References Cited

U.S. PATENT DOCUMENTS

2015/0005987 A1* 1/2015 Khorsheed .......... G06F 17/2223 701/2

* cited by examiner

*Primary Examiner* — Matthew Mikels
(74) *Attorney, Agent, or Firm* — FisherBroyles, LLP

(57) ABSTRACT

A method for generating unique identifiers for programmable mobile machines may include (1) receiving data for generating a unique signature and (2) generating the unique signature based on the data. The unique signature may identify a programmable mobile machine from among a group of programmable mobile machines within a machine environment. A corresponding method for tracking unique identifiers for programmable mobile machines may include (1) receiving a unique signature generated by a programmable mobile machine, (2) associating the unique signature with metrics, in a database, that correspond to identification data for each of a group of programmable mobile machines, and (3) determining an identity of the programmable mobile machine based on the unique signature matching at least one of the metrics in the database. Various other methods and systems are also disclosed.

20 Claims, 5 Drawing Sheets

GENERATING AND TRACKING UNIQUE IDENTIFIERS FOR PROGRAMMABLE MOBILE MACHINES

BACKGROUND

Advances in autonomous technology have resulted in the increasing use of programmable mobile machines (e.g., robots) in a variety of situations to carry out a multitude of tasks. For example, various types of robots, both individually and in groups, are often used in industry to improve productivity and reduce costs. Robots may also improve the health and safety of individuals by performing tasks in harsh or dangerous environments. Robots are also frequently used to perform many repetitive tasks that may be undesirable or for which there may be little room for error. While many tasks are well-suited for being performed using robots, it is often difficult to track robots to verify whether an assigned task has been correctly performed in both individual and group machine environments.

SUMMARY

As will be described in greater detail below, the instant disclosure describes various systems and methods for enabling programmable mobile machines (e.g., robots) to create unique detectable signatures that may be used for identification during the performance of tasks in a machine environment.

In one example, a method for generating and tracking unique identifiers for programmable mobile machines may include (1) receiving data for generating a unique signature and (2) generating the unique signature based on the data. In this example, the unique signature may identify a programmable mobile machine from among a group of programmable mobile machines within a machine environment.

In some examples, the programmable mobile machine may be a robot and the unique signature may include physical and/or ephemeral characteristics associated with the programmable mobile machine. Examples of physical characteristics may include a tire tread pattern, a synthetic fingerprint pattern, a chemical formulation pattern, or a symbol pattern. In addition, examples of ephemeral characteristics may include a vibration pattern, an acoustic pattern, a temperature pattern, a pressure pattern, a light wave pattern, a radiation pattern, a chemical exhaust pattern, or a wireless signal frequency pattern.

In some embodiments, the programmable mobile machine may send the unique signature to a detector. In one example, the detector may be a primary programmable mobile machine within a group of programmable mobile machines. In this example, the programmable mobile machine may represent an assistant programmable mobile machine within the group of programmable mobile machines. In some examples, the detector may include a computing device.

In another example, a computer-implemented method for generating and tracking unique identifiers for programmable mobile machines may include (1) receiving a unique signature generated by a programmable mobile machine, (2) associating the unique signature with metrics, in a database, that correspond to identification data for each of a group of programmable mobile machines, and (3) determining an identity of the programmable mobile machine based on the unique signature matching at least one of the metrics in the database.

In some examples, the identity of the programmable mobile machine may be determined by assigning an identification to the programmable mobile machine when the unique signature matches at least one of the metrics in the database. In some examples, the computer-implemented method may further include tracking, by a computing device, the programmable mobile machine within one or more groups of the programmable mobile machines based on the assigned identification. In some examples, the computing device may be a primary programmable mobile machine within the groups of programmable mobile machines. In addition, the computer-implemented method may further include (1) generating a new metric when the unique signature does not match any of the metrics in the database and (2) saving the new metric to the database.

In addition, a corresponding system for generating and tracking unique identifiers for programmable mobile machines may include several modules stored in memory, including (1) a generation module that (a) receives, by a programmable mobile machine, data for generating a unique signature and (b) generates, by the programmable mobile machine, a unique signature based on the data and (2) a determination module that (a) receives, by a computing device, the unique signature generated by the programmable mobile machine, (b) associates, by the computing device, the unique signature with metrics, in a database, that correspond to identification data for each of multiple programmable mobile machines, and (c) determines, by the computing device, an identity of the programmable mobile machine based on the unique signature matching at least one of the metrics in the database.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
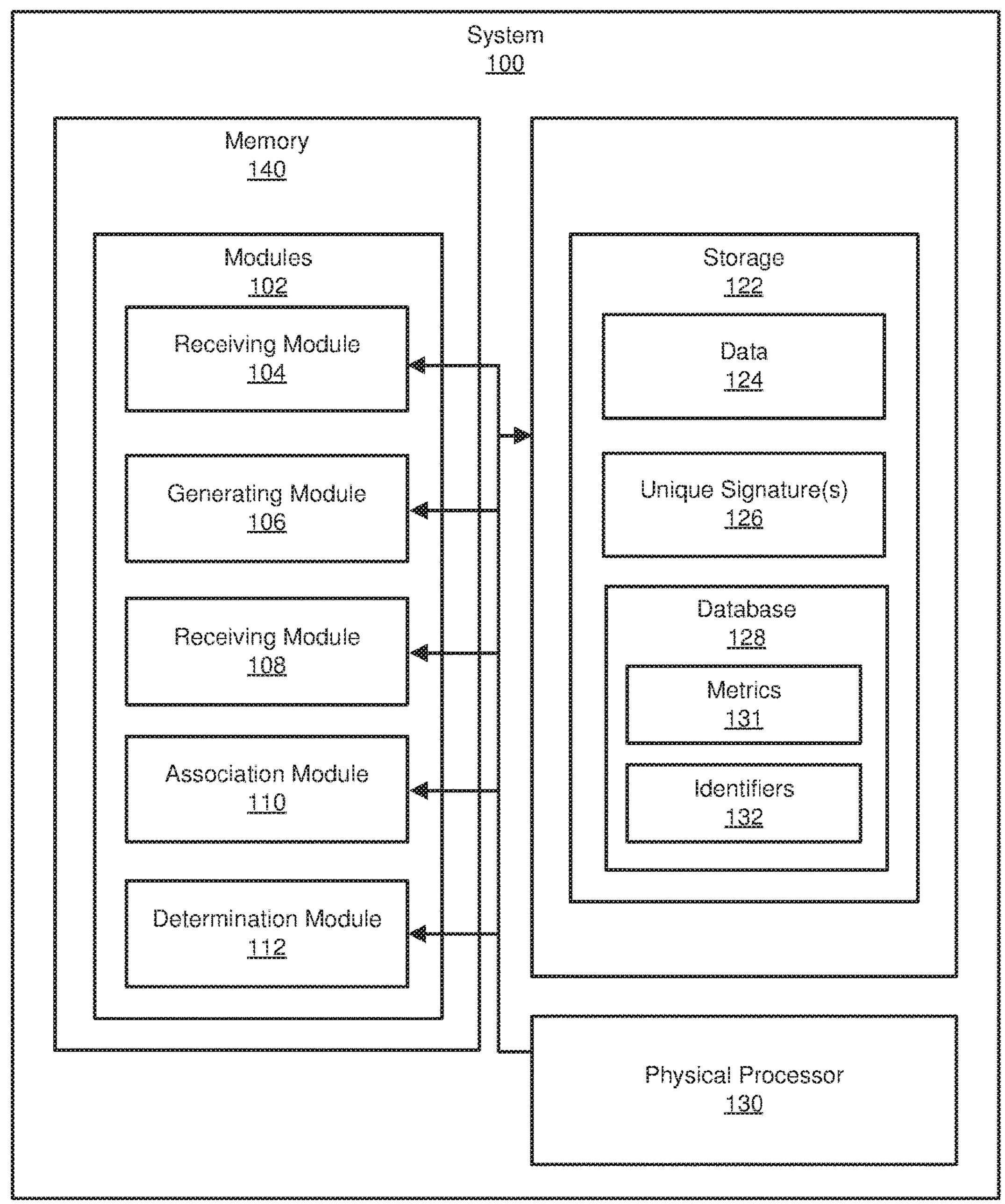
FIG. 1 is a block diagram of an exemplary system for generating and tracking unique identifiers for programmable mobile machines.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for generating and tracking unique identifiers for programmable mobile machines (e.g., robots). As will be explained in greater detail below, the programmable mobile machines described herein may be configured to generate a unique signature that identifies a programmable mobile machine either individually or within a group of other programmable mobile machines in a machine environment. In addition, a computing device (e.g., a detector) may be configured to receive these unique signatures and associate the same with a number of metrics in a database that correspond to identification data for each of a group of programmable mobile machines. The computing device may then determine the identity of a particular programmable mobile machine based on the unique signature matching at least one of the metrics in the database.

The methods and systems disclosed herein may provide one or more advantages over conventional tracking systems. For example, the unique identifiers generated by programmable mobile machines may enable a robot to be quickly and accurately identified when performing tasks individually or in groups of similarly configured robots without undue delay. Accordingly, corrective action may be expeditiously applied to robots that may be performing tasks incorrectly, thereby minimizing loss of productivity during the performance of various tasks. The programmable mobile machines disclosed herein may be utilized in a variety of environments and conditions, including, for example data centers, industrial environments (e.g., factories, plants, etc.), warehouses (e.g., storage warehouses, shipping warehouses, etc.), construction sites, buildings, vehicles, outdoor spaces, and/or any other suitable environment or location, without limitation.

Figure 2:
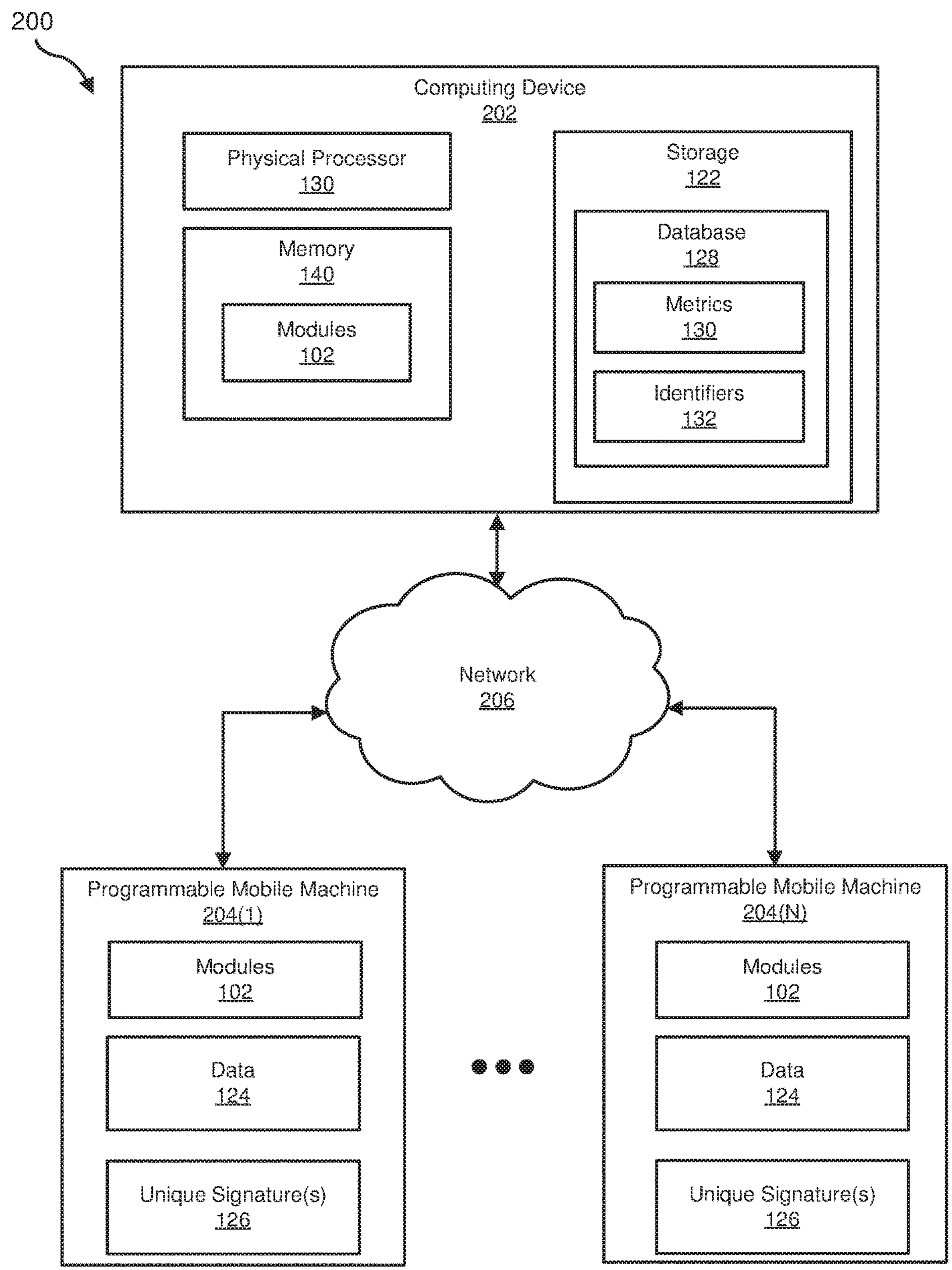
FIG. 2 is a block diagram of an additional exemplary system for generating and tracking unique identifiers for programmable mobile machines.
Figure 3:
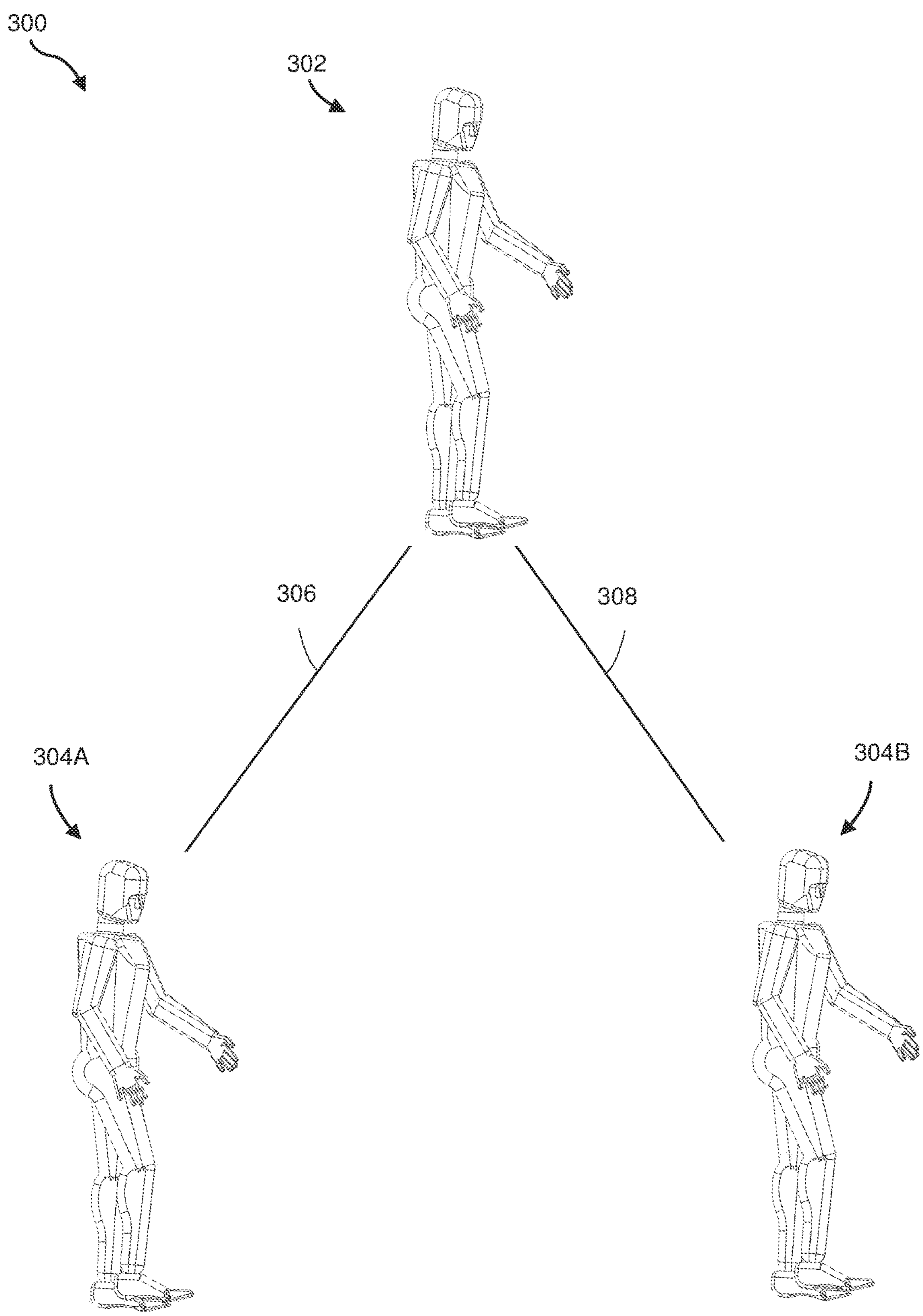
FIG. 3 is a block diagram of an additional exemplary system for generating and tracking unique identifiers for programmable mobile machines.

The following will provide, with reference to FIGS. 1-3, detailed descriptions of systems for generating and tracking unique identifiers for programmable mobile machines. In addition, the discussion corresponding to FIGS. 4-5 will provide examples of methods for generating and tracking unique identifiers for programmable mobile machines.

FIG. 1 is a block diagram of an example system 100 for generating and tracking unique identifiers for programmable mobile machines. The term "programmable mobile machine," as used herein, generally refers to any form of machine, programmable by a computer, capable of autonomously or semi-autonomously carrying out a complex series of actions or tasks. Examples of programmable mobile machines include, without limitation, robots, various aerial mobility systems (e.g., unmanned aerial vehicles), aquatic mobility systems (e.g., autonomous underwater or surface vehicles), and/or spacecraft mobility systems (e.g., unmanned spacecraft or probes) that are capable of omnidirectional movement on the ground, in the air, water, and/or space.

As illustrated in FIG. 1, example system 100 may include one or more modules 102 for performing one or more tasks. As will be explained in greater detail below, modules 102 may include a receiving module 104 that receives data 124 for generating a unique signature 126. Example system 100 may also include a generating module 106 that generates one or more unique signatures 126 based on received data 124. Example system 100 may also include a receiving module 108 that receives a unique signature 126 generated by a programmable mobile machine. Example system 100 may also include an association module 110 for associating a unique signature 126 with metrics 131 in a database 128. Example system 100 may also include a determination module 112 for determining an identity of a programmable mobile machine based on a unique signature 126 matching at least one of metrics 131 in database 128. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 1 (e.g., computing device 202 and/or programmable mobile machines 204(1) and 204(N)). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate the generation and tracking of unique identifiers for programmable mobile machines. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional data storage devices, such as storage 122. Storage 122 generally represents any type or form of data storage device capable of storing data files. In one example, storage 122 may include data 124, unique signatures 126, and database 128. Data 124 may represent allocated space on storage 122 for storing characteristics of unique signatures 126. In some examples, data 124 may include instructions utilized by a programmable mobile machine to generate a unique signature 126. In addition, unique signatures 126 may include unique physical or ephemeral characteristics associated with the programmable mobile machine. Examples of physical characteristics may include, without limitation, a tire tread pattern, a synthetic fingerprint, a chemical formulation pattern (e.g., a paint or dye pattern), and/or a symbol (e.g., a physical marker generated by the programable mobile machine on a surface). In addition, examples of ephemeral characteristics may include, without limitation, a vibration pattern, an acoustic pattern, a temperature pattern, a pressure pattern, a light wave pattern, a radiation pattern, a chemical exhaust pattern, and/or a wireless signal frequency pattern.

In some examples, database 128 may represent a backend database that tracks and categorizes metrics 131 with identifiers (e.g., identification data) 132. Metrics 131 may represent multiple sets of physical or ephemeral characteristics included in unique signatures 126 for multiple programmable mobile machines. In some examples, when a metric 130 matches a unique signature 126 for a programmable mobile machine, an identifier 132 may be assigned for identifying the programmable mobile machine in a machine environment.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with programmable mobile machines 204(1)-204(N) via a network 206. In one example, all or a portion of the functionality of modules 102 may be performed by computing device 202, programmable mobile machines 204(1)-204(N), and/or any other suitable computing system. As will be described in greater detail below, one or more of modules 102 from FIG. 1 may, when executed by at least one physical processor of computing device 202 and/or programmable mobile machines 204(1)-204(N), enable computing device 202 and/or programmable mobile machines 204(1)-204(N) to generate and track unique identifiers for programmable mobile machines.

Computing device 202 generally represents any type or form of computing device capable of reading computer-executable instructions. In one example, computing device 202 may represent a primary programmable mobile machine configured to track and/or control one or more assistant programmable mobile machines during the initiation and/or performance of various tasks. In some examples, these tasks may include, without limitation, moving equipment in a datacenter, accessing secure areas (e.g., a security cage or other inaccessible area) to retrieve hard drives that need to be destroyed, etc. In another example, computing device 202 may represent an external computing device configured to track one or more programmable mobile machines (e.g., programmable mobile machines 204(1)-204(N)) in a machine environment. Examples of external computing devices represented by computing device 202 may include, without limitation, laptops, tablets, desktops, servers, cellular phones, Personal Digital Assistants (PDAs), multimedia players, embedded systems, wearable devices (e.g., smart watches, smart glasses, etc.), so-called Internet-of-Things devices (e.g., smart appliances, etc.), gaming consoles, variations or combinations of one or more of the same, or any other suitable computing device.

Programmable mobile machines 204(1)-204(N) generally represent any type or form of computing device that are each capable of generating a unique signature 126 used for identification between each other as well as among other programmable mobile machines in a machine environment. In one example, programmable mobile machines 204(1)-204(N) may each represent a robot configured to perform various tasks, either individually or collectively (e.g., as part of a robot group or swarm). For example, one or more of programmable mobile machines 204(1)-204(N) may be configured to move equipment in a datacenter, access secure areas (e.g., a security cage or other inaccessible area) to retrieve hard drives that need to be destroyed, etc. In some examples, programmable mobile machines 204(1)-204(N) may be configured as assistant robots that are tracked and controlled by a primary robot (e.g., computing device 202) based on their respective unique signatures 126 to perform the tasks discussed above. Although illustrated as a single entity in FIG. 2, each of programmable mobile machines 204(1)-204(N) may include and/or represent a plurality of programmable mobile machines that work and/or operate in conjunction with one another.

Network 206 generally represents any medium or architecture capable of facilitating communication or data transfer. In one example, network 206 may facilitate communication between computing device 202 and programmable mobile machines 204(1)-204(N). In this example, network 206 may facilitate communication or data transfer using wireless and/or wired connections. Examples of network 206 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

System 100 and/or system 200 may be implemented in a variety of ways and scenarios to accomplish any number of tasks and purposes. For example, system 100 and/or system 200 may be used to identify, track, and/or manage tasks performed by programmable mobile machines in data centers, industrial environments (e.g., factories, plants, etc.), warehouses (e.g., storage warehouses, shipping warehouses, etc.), construction sites, buildings, vehicles, outdoor spaces, and/or any other suitable environment or location, without limitation. FIG. 3 is an illustration of one such environment in which all or a portion of system 100 and/or system 200 may be implemented. As shown in this figure, system 300 may include a robot 302 in communication with robots 304A and 304B via communication links 306 and 308. In one example, all or a portion of the functionality of modules 102 may be performed by robots 302, 304A, and 304B. In particular, one or more of modules 102 from FIG. 1 may, when executed by at least one physical processor of robots 302 and/or robots 304A and 304B, enable robots 302 and/or robots 304A an 304B to generate and/or track unique robot identifiers.

In one example, robot 302 may represent a primary robot and robots 304A and 304B may represent assistant robots configured to be tracked by and carry out various tasks via instructions wirelessly communicated by robot 302 over communication links 306 and 308. For example, robot 302 may be configured to track robots 304A and 304B based on identifiers 132 determined from each robot's unique signature(s). Robot 302 may utilize identifiers 132 to determine whether robots 304A and 304B are performing assigned tasks and/or staying within their group or swarm. In another example, robot 302 may be configured as a "scout" robot that initiates a particular task (e.g., moving towards a particular location to determine whether the location is safe) and then communicating instructions to robots 304A and 304B (e.g., leaving a physical or ephemeral trace corresponding to its unique signature 126 for robots 304A and 304B to follow upon determining the location to be safe).

Figure 4:
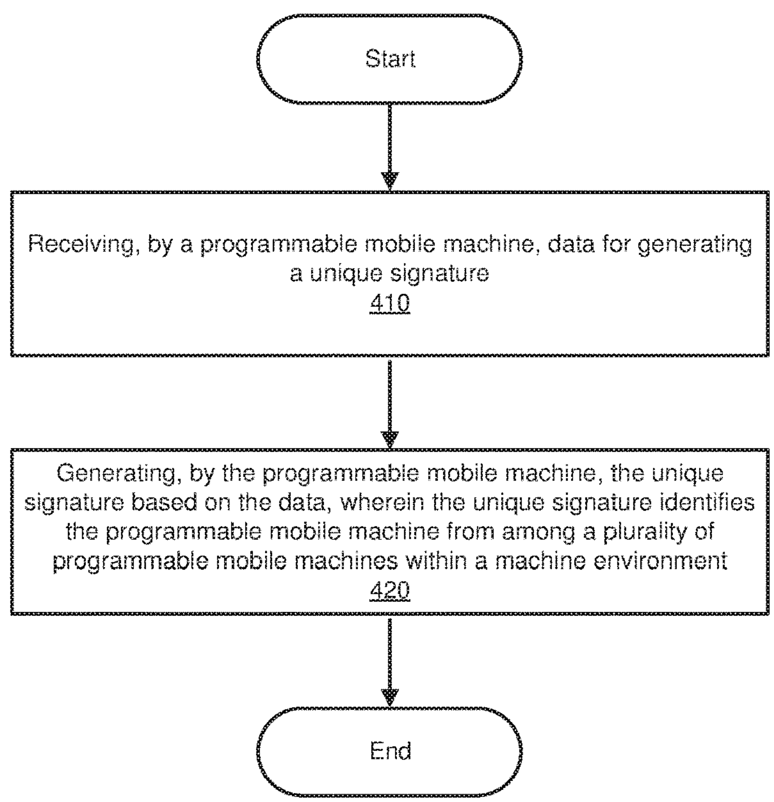
FIG. 4 is a flow diagram of an exemplary method for generating and tracking unique identifiers for programmable mobile machines.

FIG. 4 is a flow diagram of an example computer-implemented method 400 for generating unique identifiers for programmable mobile machines. The steps shown in FIG. 4 may be performed by any suitable computer-executable code and/or computing system, including system 100 in FIG. 1, system 200 in FIG. 2, system 300 in FIG. 3, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may receive, by a programmable mobile machine, data for generating a unique signature. For example, receiving module 104 may, as part of programmable mobile machine 204(1) in FIG. 2, receive data 124 including instructions for generating a unique signature 126. Receiving module 104 may receive data 124 in a variety of ways. For example, programmable mobile machine 204(1) may represent an assistant robot in a robot swarm and receiving module 104 may receive data 124 from a primary robot (e.g., programmable mobile machine 204(N)) over network 206. As another example, data 124 may be entered into an external computing device (e.g., computing device 202) by a user and received by receiving module 104 of programmable mobile machine 204(1) and/or programmable mobile machine 204(N) over network 206. In another example, receiving module 104 may receive data 124 via a user directly entering data 124 into programmable mobile machine 204(1).

At step 404, one or more of the systems described herein may generate, by a programmable mobile machine, a unique signature based on the data received at step 402. For example, generating module 406 may, as part of programmable mobile machine 204(1) (or alternatively programmable mobile machine 204(N)) in FIG. 2, generate unique signature 126 based on received data 124. Generating module 106 may generate unique signature 126 in a variety of ways. For example, generating module 106 may generate unique signature 126 based on one or more physical characteristics associated with programmable mobile machine 204(1). Additionally or alternatively, generating module 106 may generate unique signature 126 based on one or more ephemeral characteristics associated with programmable mobile machine 204(1).

In some examples, a physical characteristic that may be generated by generating module 106 may include a tire tread pattern of one or more tires on a programmable mobile machine. Additionally or alternatively, a physical characteristic that may be generated by generating module 106 may include a synthetic fingerprint pattern (or other biometric data such as an iris scan, etc.). As one example, a synthetic fingerprint pattern may be generated by a soft pad attached to a robot hand of a programmable mobile machine (e.g., a robot hand on robot 304A of FIG. 3) upon which a fingerprint may be imprinted so as to leave a detectable trace when coming in contact with a surface. Additionally or alternatively, a physical characteristic that may be generated by generating module 106 may include a chemical formulation pattern such as a certain type of paint or a fluorescent dye that may be applied by a programmable mobile machine to a surface. Additionally or alternatively, a physical characteristic that may be generated by generating module 106 may include a unique symbol pattern. For example, programmable mobile machine 204(1) may be configured to drill, bore, or otherwise apply a physical marker corresponding to a certain type of symbol onto a surface.

In some examples, an ephemeral characteristic that may be generated by generating module 106 may include a vibration pattern. For example, programmable mobile machine 204(1) may natively (or may be configured to) vibrate at one or more frequencies during operation that are unique to vibration frequencies associated with other programmable mobile machines (e.g., programmable mobile machine 204(N)).

In some examples, an ephemeral characteristic that may be generated by generating module 106 may additionally or alternatively include a temperature pattern. For example, programmable mobile machine 204(1) may natively (or may be configured to) operate within a certain temperature range that is unique to an operating temperature range for other programmable mobile machines (e.g., programmable mobile machine 204(N)).

In some examples, an ephemeral characteristic that may be generated by generating module 106 may additionally or alternatively include a wireless signal frequency pattern. For example, programmable mobile machine 204(1) may be assigned a specific wireless signal frequency or frequency range for communicating certain data that is unique to wireless frequencies utilized by other programmable mobile machines (e.g., programmable mobile machine 204(N)).

In some examples, other ephemeral characteristics that may be generated by generating module 106 for programmable machine 204(1) may additionally or alternatively include acoustic patterns, pressure patterns, light wave patterns, radiation patterns, and/or chemical exhaust patterns. In some examples, generating module 106, after generating unique signature 126, may then send unique signature 126 to a detector (e.g., computing device 202 in FIG. 2 or robot 302 in FIG. 3).

Figure 5:
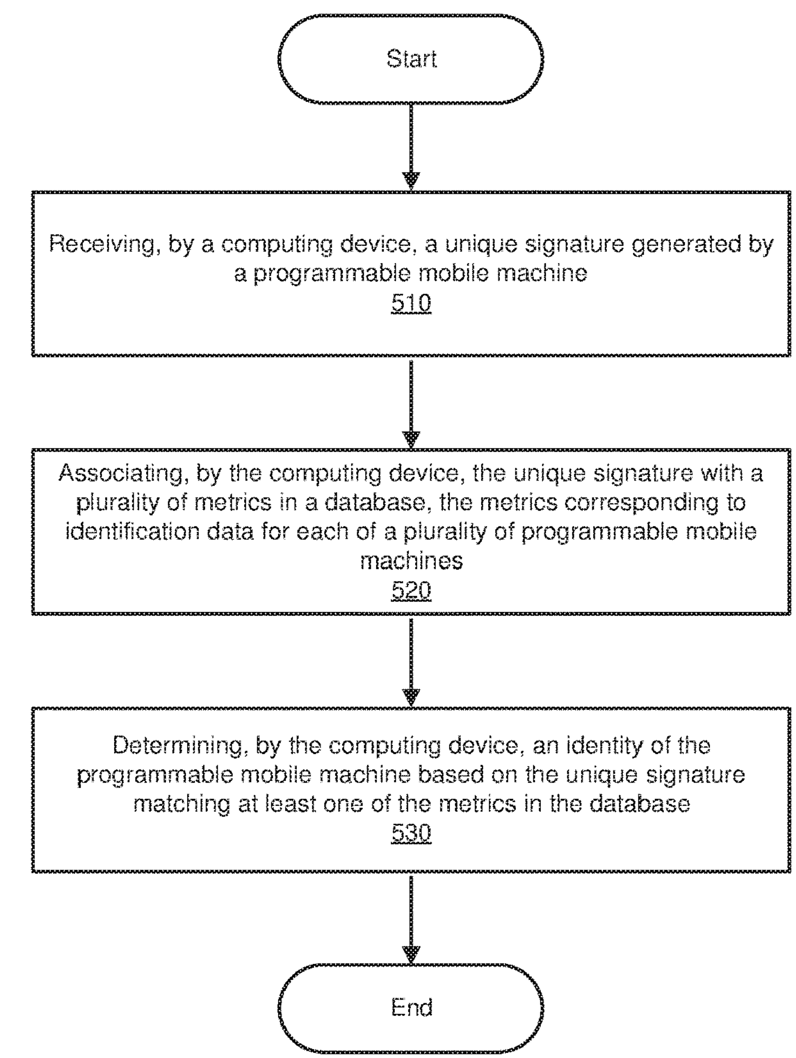
FIG. 5 is a flow diagram of an additional exemplary method for generating and tracking unique identifiers for programmable mobile machines.

FIG. 5 is a flow diagram of an example computer-implemented method 500 for tracking the unique identifiers generated by method 400 in FIG. 4. The steps shown in FIG. 5 may be performed by any suitable computer-executable code and/or computing system, including system 100 in FIG. 1, system 200 in FIG. 2, system 300 in FIG. 3, and/or variations or combinations of one or more of the same. In one example, each of the steps shown in FIG. 5 may represent an algorithm whose structure includes and/or is represented by multiple sub-steps, examples of which will be provided in greater detail below.

As illustrated in FIG. 5, at step 502 one or more of the systems described herein may receive, by a computing device, a unique signature generated by a programmable mobile machine. For example, receiving module 108 may, as part of computing device 202 in FIG. 2, receive a unique signature 126 generated by programmable mobile machines 204(1) or 204(N). Receiving module 108 may receive unique signature 126 in a variety of ways. For example, unique signature 126 may include one or more visually detectable physical characteristics and receiving module 108 may receive unique signature 126 through visual means. As an example, computing device 202 (which, as discussed above, may include an external computing device or a robot, such as robot 302) may be configured with a camera (or other visual capture means) to capture a tire tread, synthetic fingerprint, chemical formulation trail (e.g., paint or fluorescent dye), and/or a physical mark generated by generation module 106.

Additionally or alternatively, unique signature 126 may include one or more ephemeral characteristics and receiving module 108 may receive unique signature 126 using a detector. For example, computing device 202 may be configured with a vibration detector to detect a vibration pattern corresponding to unique signature 126, a temperature detector to detect a temperature range corresponding to unique signature 126, a wireless signal detector to detect a wireless signal frequency range corresponding to unique signature 126, an acoustic detector to detect an acoustic pattern corresponding to unique signature 126, a pressure detector to detect a pressure pattern corresponding to unique signature 126, a light detector to detect a light wave pattern corresponding to unique signature 126, a radiation detector to detect a radiation pattern corresponding to unique signature 126, a chemical exhaust detector to detect a chemical exhaust pattern corresponding to unique signature 126, among many other possibilities.

At step 504, one or more of the systems described herein may associate, by a computing device, a unique signature with metrics stored in a database. For example, association module 110 may, as part of computing device 202 in FIG. 2, associate a unique signature 126 (received from either of programmable mobile machines 204(1) or 204(N)) with metrics 131 in database 128. Association module 110 may associate a unique signature 126 with metrics 131 in a variety of ways. For example, association module 110 may compare physical and/or ephemeral characteristics making up a unique signature 126 with a collection of physical and/or ephemeral characteristic data stored as metrics 131 to determine a match. For example, if a unique signature 126 for programmable mobile machine 204(1) includes a tire tread pattern and a chemical exhaust trail, association module 110 may associate the aforementioned characteristics with metrics 131.

At step 506, one or more of the systems described herein may determine, by a computing device, an identity of a programmable mobile machine based on a unique signature matching metrics stored in a database. For example, determination module 112 may, as part of computing device 202 in FIG. 2, determine the identity of programmable mobile machine 204(1) based on a unique signature 126 (received from programmable mobile machine 204(1)) matching metrics 131 in database 128. Determination module 112 may determine the identity of programmable mobile machine 204(1) in a variety of ways. For example, determination module 112 may locate a metric 130 that includes physical and/or ephemeral characteristic data that matches physical and/or ephemeral characteristics in a received unique signature 126. As an example, determination module 112 may determine that a metric 130 including a tire tread pattern and chemical exhaust trail data that matches the same characteristics in a unique signature 126 received from programmable mobile machine 204(1) identifies programmable mobile machine 204(1).

In some examples, determination module 112 may determine the identity of programmable mobile machine 204(1) based solely on one or more physical characteristics in a unique signature 126 matching a metric 130 that includes corresponding physical characteristic data. In some examples, determination module 112 may determine the identity of programmable mobile machine 204(1) based solely on one or more ephemeral characteristics in a unique signature 126 matching a metric 130 that includes corresponding ephemeral characteristic data. In some examples, determination module 112 may determine the identity of programmable mobile machine 204(1) based on a combination of physical and ephemeral characteristics in a unique signature 126 matching a metric 130 that includes a combination of physical and ephemeral characteristic data.

In some examples, determination module 112, may assign an identifier 132 to a programmable mobile machine (e.g., programmable mobile machine 204(1)) after matching a unique signature 126 to a metric 130 in database 128. In some examples, if determination module 112 is unable to locate a matching metric 130 for a unique signature 126, determination module may generate a new metric with data corresponding to physical and/or ephemeral characteristics in a unique signature 126 and save the new metric to database 128.

In some examples, after determination module 112 has assigned an identifier 132 to a programmable mobile machine (e.g., programmable mobile machine 204(1)), computing device 202 may then be utilized to track programmable mobile machine 204(1) within one or more groups of other programmable machines, based on identifier 132. For example, programmable mobile machine 204(1) may be tracked to determine if it is performing an assigned task (e.g., moving to a specific location) within a robot swarm or staying with its assigned group during tasks performed by multiple swarms.

As explained above in connection with FIGS. 1-5, one or more of the methods and/or systems described herein may provide for the generation of unique identifiers for tracking and/or controlling programmable mobile machines, such as robots, and other computing machinery. The identifiers may be based on a variety of traits/characteristics, including physical traits (e.g., tire tracks, synthetic fingerprints, weight, etc.) and ephemeral signals/trails (e.g., wireless signals, chemical exhausts/trails, light waves, soundwaves, radiation, heat signatures, etc.), among many others. Robots may be tracked/controlled individually or in groups for a variety of purposes, including to restrict access to sensitive areas, guide/verify proper artificial intelligence movement operations, etc.

As discussed throughout the instant disclosure, the disclosed methods and systems may provide one or more advantages over conventional tracking systems. For example, the unique identifiers generated by the programmable mobile machines may enable a robot to be quickly and accurately identified when performing tasks individually or in groups of similarly configured robots without undue delay. Accordingly, corrective action may be expeditiously applied to robots that may be performing tasks incorrectly, thereby minimizing loss of productivity during the performance of various tasks. Programmable mobile machines disclosed herein may be utilized in a variety of environments and conditions, including, for example data centers, industrial environments (e.g., factories, plants, etc.), warehouses (e.g., storage warehouses, shipping warehouses, etc.), construction sites, buildings, vehicles, outdoor spaces, and/or any other suitable environment or location, without limitation.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In addition, one or more of the modules described herein may transform data, physical devices, and/or representations of physical devices from one form to another. For example, one or more of the modules recited herein may receive data to be transformed, transform the data, output a result of the transformation to generate a unique signature for a programmable mobile machine, and use the result of the transformation to identify the programmable mobile machine in a machine environment. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:

receiving, by a programmable mobile machine comprising at least one physical processor and at least one memory device, data including instructions for generating a unique signature; and generating, on the programmable mobile machine, the unique signature based on the instructions, wherein the unique signature comprises an identifier that identifies the programmable mobile machine from among a plurality of programmable mobile machines within a machine environment based on one or more detectable characteristics associated with the programmable mobile machine, wherein the identifier comprises an intrinsic pattern created by the programmable mobile machine.

2. The method of claim 1, wherein the one or more detectable characteristics comprises at least one of physical or ephemeral characteristics associated with the programmable mobile machine.

3. The method of claim 2, wherein the physical or ephemeral characteristics comprises at least one of:

a tire tread pattern;
a synthetic fingerprint pattern;
a chemical formulation pattern; or
a symbol pattern.

4. The method of claim 2, wherein the physical or ephemeral characteristics comprises at least one of:

a vibration pattern;
an acoustic pattern;
a temperature pattern;
a pressure pattern;
a light wave pattern;
a radiation pattern;
a chemical exhaust pattern; or
a wireless signal frequency pattern.

5. The method of claim 1, further comprising sending, from the programmable mobile machine, the unique signature to a detector.

6. The method of claim 5, wherein:

the detector comprises a primary programmable mobile machine within a group of programmable mobile machines; and the programmable mobile machine comprises an assistant programmable mobile machine within the group of programmable mobile machines.

7. The method of claim 5, wherein the detector comprises a computing device.

8. The method of claim 1, wherein the programmable mobile machine comprises a robot.

9. A system comprising:

a generation module that:

receives, by a programmable mobile machine comprising at least one physical processor and at least one memory device, data including instructions for generating a unique signature; and generates, on the programmable mobile machine, the unique signature based on the instructions, wherein the unique signature comprises an identifier that identifies the programmable mobile machine from among a plurality of programmable mobile machines within a machine environment based on one or more detectable characteristics associated with the programmable mobile machine, wherein the identifier comprises an intrinsic pattern created by the programmable mobile machine.

10. The system of claim 9, wherein the one or more detectable characteristics comprises at least one of physical or ephemeral characteristics associated with the programmable mobile machine.

11. The system of claim 10, wherein the physical or ephemeral characteristics comprises at least one of:
a tire tread pattern;
a synthetic fingerprint pattern;
a chemical formulation pattern; or
a symbol pattern.

12. The system of claim 10, wherein the physical or ephemeral characteristics comprises at least one of:

a vibration pattern;
an acoustic pattern;
a temperature pattern;
a pressure pattern;

a light wave pattern;
a radiation pattern;
a chemical exhaust pattern; or
a wireless signal frequency pattern.

13. The system of claim 9, wherein the programmable mobile machine sends the unique signature to a detector.

14. The system of claim 13, wherein the detector comprises a primary programmable mobile machine within a group of programmable mobile machines.

15. The system of claim 13, wherein the programmable mobile machine comprises an assistant programmable mobile machine within a group of programmable mobile machines.

16. The system of claim 13, wherein the detector comprises a computing device.

17. The system of claim 9, wherein the programmable mobile machine comprises a robot.

18. A method comprising:

receiving, by a programmable mobile machine comprising at least one physical processor and at least one memory device, data including instructions for generating a unique signature;

generating, on the programmable mobile machine, the unique signature based on the instructions, wherein the unique signature comprises an identifier that identifies the programmable mobile machine from among a plurality of programmable mobile machines within a machine environment based on one or more detectable characteristics associated with the programmable mobile machine, wherein the identifier comprises an intrinsic pattern created by the programmable mobile machine; and sending, from the programmable mobile machine, the unique signature to a detector.

19. The method of claim 18, wherein the one or more detectable characteristics comprises at least one of physical or ephemeral characteristics associated with the programmable mobile machine.

20. The method of claim 18, wherein the detector comprises a primary programmable mobile machine within a group of programmable mobile machines.

* * * * *